(12) United States Patent
Ma et al.

(10) Patent No.: US 12,311,440 B2
(45) Date of Patent: May 27, 2025

(54) POWDER FOR LASER SINTERING, AND USE

(71) Applicants: INFINITE FLEX GMBH, Oberursel (DE); INFINITE FLEX (TAICANG) CO. LTD., Jiangsu (CN)

(72) Inventors: Kangkai Ma, Friedrichsdorf (DE); Ulrich Andreas Hirth, Bayreuth (DE)

(73) Assignees: INFINITE FLEX GMBH, Oberursel (DE); INFINITE FLEX (TAICANG) CO. LTD., Jiangsu (CN)

( * ) Notice: Subject to any disclaimer, the term of this patent is extended or adjusted under 35 U.S.C. 154(b) by 541 days.

(21) Appl. No.: 17/617,452

(22) PCT Filed: Jun. 3, 2020

(86) PCT No.: PCT/EP2020/065268
§ 371 (c)(1),
(2) Date: Dec. 8, 2021

(87) PCT Pub. No.: WO2020/254108
PCT Pub. Date: Dec. 24, 2020

(65) Prior Publication Data
US 2022/0219230 A1  Jul. 14, 2022

(30) Foreign Application Priority Data
Jun. 19, 2019 (DE) .................... 10 2019 116 665.9

(51) Int. Cl.
*B22F 10/28* (2021.01)
*B22F 1/052* (2022.01)
(Continued)

(52) U.S. Cl.
CPC .............. *B22F 10/28* (2021.01); *B22F 1/052* (2022.01); *B22F 1/16* (2022.01); *B22F 1/18* (2022.01);
(Continued)

(58) Field of Classification Search
CPC ......... B33Y 10/00; B33Y 70/00; B33Y 80/00; B22F 1/16; B22F 1/17; B22F 2301/10; B22F 2303/20
See application file for complete search history.

(56) References Cited

U.S. PATENT DOCUMENTS

| 11,123,795 B2 | 9/2021 | Aixala |
| 2009/0044906 A1 | 2/2009 | Goring |

(Continued)

FOREIGN PATENT DOCUMENTS

| CN | 109746435 A | 5/2019 |
| EP | 3260223 A1 | 12/2017 |

(Continued)

OTHER PUBLICATIONS

International Search Report Dated Aug. 10, 2020, PCT/EP2020/065268, 4 pages.

(Continued)

*Primary Examiner* — Ricardo D Morales
(74) *Attorney, Agent, or Firm* — LUCAS & MERCANTI, LLP

(57) ABSTRACT

A surface-modified powder for laser sintering that allows improved incoupling of the radiation energy of the laser. The surface-modified powder avoids problems arising in the laser sintering of materials having a low absorptance for the laser radiation. The surface-modified powder has particles having particle cores and having laser absorbers bonded to a surface of each particle core, the laser absorbers covering at least 25% of the surface of each particle core and having a higher absorptance for laser radiation for laser sintering than the particle core.

9 Claims, 2 Drawing Sheets

(51) Int. Cl.
   *B22F 1/16*     (2022.01)
   *B22F 1/18*     (2022.01)
   *B33Y 10/00*    (2015.01)
   *B33Y 70/00*    (2020.01)
(52) U.S. Cl.
   CPC .............. *B33Y 10/00* (2014.12); *B33Y 70/00* (2014.12); *B22F 2301/10* (2013.01)

(56) References Cited

U.S. PATENT DOCUMENTS

| | | | |
|---|---|---|---|
| 2014/0191445 A1* | 7/2014 | Rist ..................... | B29C 35/0888 264/496 |
| 2014/0321931 A1* | 10/2014 | Gey ........................ | B23P 15/28 408/199 |
| 2015/0004042 A1 | 1/2015 | Nimal | |
| 2016/0280544 A1* | 9/2016 | Wissemborski ........ | C01B 25/37 |
| 2017/0225228 A1 | 8/2017 | Nagahama | |
| 2018/0051376 A1* | 2/2018 | Sharon ..................... | B22F 1/16 |
| 2018/0355187 A1* | 12/2018 | Huddleston ........ | B23K 26/0622 |
| 2020/0055116 A1 | 2/2020 | Yoshida | |

FOREIGN PATENT DOCUMENTS

| | | |
|---|---|---|
| EP | 3409349 A1 | 12/2018 |
| WO | 0156736 A2 | 8/2001 |
| WO | 2018199110 A1 | 3/2020 |

OTHER PUBLICATIONS

Tolochko N et al: "Selective laser sintering of single- and two-component metal powders", Rapid Prototyping Journal, MCB University Press, Bradford, GB, Bd. 9, Nr. 2, Jan. 1, 2003 (Jan. 1, 2003), pp. 68-78, XP002678977, ISSN: 1355-2546, DOI: 10.1108/13552540310467077 Zusammenfassung "Starting powders and Laser processing and characterisation"; p. 72 p. 73, linke Spalte, Absatz 2—p. 73, rechte Spalte, Absatz 1 "Coated powders"; pp. 75-77.
International Preliminary Report on Patentability Dated May 27, 2021, 6 pages.

\* cited by examiner

POWDER FOR LASER SINTERING, AND USE

CROSS-REFERENCE TO RELATED APPLICATIONS

This application is a 371 of PCT/EP2020/065268, filed Jun. 3, 2020, which in turn claims the priority of DE 10 2019 116 665.9 filed Jun. 19, 2019. The priority of both applications is hereby claimed and both applications are incorporated herein by reference.

BACKGROUND OF THE INVENTION

The invention relates to a powder for laser sintering and also the use of the powder.

Laser sintering in a powder bed is a process in which the powder, for example composed of metal or polymer, is sintered or completely melted without use of binders and after solidification of the melt forms a homogeneous material of high density. In laser sintering in a powder bed, the energy which is introduced by a laser is absorbed by the powder and leads to locally delimited sintering of particles with reduction in the total surface area or leads to melting.

Selective laser sintering (SLS) is an additive manufacturing process for producing three-dimensional structures, for example a component, from a powder by laser sintering using a laser. The geometric data of the component to be produced have to be present as layer data. The powder, for example a metal or ceramic powder, is applied in a layer thickness of from 1 to 200 μm over the full area of a building platform. The layers are sintered in the powder bed under computer control according to the layer contour of the component on the basis of the layer data. The building platform is lowered slightly before each step in order for the next layer to be applied subsequently. The layerwise production of the component makes it possible to produce even undercut contours. A great advantage of SLS is that support structures are not necessary. The component is supported by the surrounding powder during its production. At the end of the production process, the remaining powder can be knocked off.

Laser sintering is carried out using, in particular, fiber lasers or Nd:YAG lasers which produce laser radiation in the near infrared range of 780 nm 3000 nm. The powders used for laser sintering have a different degree of absorption for laser radiation having a defined wavelength, depending on the composition of the material. Which fraction of the incident laser radiation is absorbed by the powder depends on the degree of absorption, also referred to as spectral absorption coefficient.

Powders having a low degree of absorption at a customary laser wavelength in the near infrared range cause problems during laser sintering. The absorption of copper at a customary laser wavelength of, for example, 1064 nm is less than 5%. Owing to the low degree of absorption, copper powder cannot be sintered using conventional lasers having the customary laser wavelength. Due to the reflection behavior of the copper powder at this laser wavelength, the radiation energy is predominantly absorbed into the support surface for the powder and can lead to thermal overloading or even destruction of the support surface.

BRIEF SUMMARY OF THE INVENTION

Proceeding from this prior art, it is an object of the invention to provide a powder for laser sintering which allows improved absorption of the radiation energy of the laser, in particular, a powder which avoids or significantly reduces problems in the laser sintering of materials having a low degree of absorption for the laser radiation should.

In addition, a process for producing layers and three-dimensional structures is proposed.

The achievement of the object is accomplished by a surface-modified powder having improved absorption properties in the region of the wavelength of the laser radiation for the laser sintering.

Specifically, the object is achieved by a surface-modified powder for laser sintering, which powder comprises particles having a particle core and laser absorbers bound to the surface of each particle core, where the laser absorbers occupy the surface of each particle core to an extent of at least 25%, preferably at least 30%, and have a higher degree of absorption for laser radiation for laser sintering compared to the particle core. The particles of the powder all consist of the same material. However, the particles of the powder can vary in respect of size and shape. The particles preferably have a particle size having an equivalent diameter D50 in the range of 10-100 μm.

The laser absorbers are molecules which are bound to the surface of the particle core and are composed of a material which absorbs the laser radiation incident on the particles more strongly than the material of the particle core. The absorbed laser radiation is effectively converted into heat in the laser absorbers.

Owing to the attachment of the laser absorbers to the surface, the heat is transferred by thermal conduction to the particle core. The temperature difference required for thermal conduction between particle core and laser absorbers is brought about by the lower degree of heating of the particle core compared to the laser absorbers because of the lower degree of absorption of the particle core for the laser radiation.

In order to improve absorption of the radiation energy at a defined wavelength of the laser in the case of a powder which is fundamentally suitable for laser sintering, the difference between the degree of absorption of the laser absorbers and the degree of absorption of the particle core is at least 10% of the degree of absorption of the particle core. At a degree of absorption of the particle core of, for example, 50%, the difference is at least 5%, i.e. absorbers having a degree of absorption of at least 55% would measurably shorten the time required for laser sintering in the powder bed.

In order to make laser sintering possible in the case of a powder which is fundamentally unsuitable for laser sintering, for example a powder composed of pure copper, the difference between the degree of absorption of the laser absorbers and the degree of absorption of the particle core has to be significantly greater. At a typical wavelength of a fiber laser of 1064 nm, the degree of absorption of pure copper is about 5%. In order to be able to sinter a particle core composed of pure copper, the degree of absorption of the attached absorbers is at least 20%, preferably 30%.

The laser absorbers, i.e. the molecules which absorb the laser radiation, are preferably bound by adsorption to the surface of each particle core. Attachment occurs, in particular, in the form of physisorption, which is a type of adsorption in which the molecules are bound by van der Waals forces to the surface of each particle core. The electrostatic forces acting in physisorption are weaker than the electrostatic forces in chemical bonding, which likewise comes into consideration, but are sufficient to stably attach the molecules sufficiently strongly to the surface of the particle core for the sintering process. An advantage of bonding by physisorption or van der Waals forces is the small change in the particle core and the laser absorbers.

The absorption behavior of the materials for the particle core and the laser absorbers is preferably determined for laser radiation having a wavelength in the near infrared range, in particular at 1064 nm. The near infrared range extends from 780 nm to 3 μm and encompasses the typical wavelengths of laser radiation which are emitted by solid-state lasers for laser sintering. An Nd:YAG solid-state laser emits, for example, laser radiation having a wavelength of 1064 nm.

The powder preferably comprises particle cores which have a relatively low degree of absorption of less than 30% for the incident laser radiation in the near infrared range, in particular at 1064 nm. The particle core materials are metals or alloys thereof, for example copper, copper alloys, aluminum, aluminum alloys, iron, iron alloys, stainless steels having high nickel, chromium, vanadium or molybdenum contents and also titanium and titanium alloys. However, the particle cores can also consist of glass and ceramic.

It is known that some metal oxides or metal hydroxides, for example titanium dioxide, iron oxide, tin-antimony oxide, tin oxide, antimony oxide, bismuth oxide, dicopper hydroxide phosphate have an excellent absorption capability in the usual wavelength range of the lasers used for laser sintering, i.e. in the region of the near infrared. On irradiation of the materials with laser radiation in the near infrared range, these metal oxides or metal hydroxides heat up very strongly and can sometimes give rise to temperatures of significantly above 1000° C. These materials are therefore particularly suitable as laser absorbers bound to the surface of each particle core.

In the case of metal powders which are used in the laser sintering process, the strong heating of these metal oxides or metal hydroxides which readily absorb radiation when irradiated with a laser in the near infrared range can be used for sintering of the metal particle cores.

If the particles are to be partially coated with further materials, for example in order to improve the powder flow behavior, it has to be ensured in the production thereof that the laser-absorbing molecules are firstly bound directly to the metallic particle core before further materials are applied.

Very fine metal powders frequently display a poor powder flow behavior, which can impair introduction of the powder into the powder bed for laser sintering. In order to influence the powder flow behavior favorably and at the same time allow effective laser sintering, the particle size has an equivalent diameter D50 in the range of 10-100 μm.

The surface-modified powder of the invention is particularly suitable for use for laser sintering in a powder bed of the surface-modified powder, for example in order to produce a coating on a substrate. If the particle cores of the powder consist of pure copper, conductor track structures and/or contact regions which display a high conductivity can be produced on surfaces by laser sintering.

However, not only coatings but also three-dimensional structures composed of the powder according to the invention can be produced by selective laser sintering. In particular, the powder now allows selective laser sintering also to be used for materials which hitherto did not come into consideration because of their low degree of absorption for laser radiation in the near infrared range of the solid-state lasers customarily used, for example pure copper.

The surface-modified powder according to the invention can advantageously also be used in laser buildup welding using powder.

Laser buildup welding is a process in which a surface is built up on a workpiece by means of melting and simultaneous application of a material, in particular even in powder form. In laser buildup welding, a high-power laser, predominantly a diode laser or a fiber laser, serves as heat source. The process can be used both for producing layers and also for producing free-formed 2.5D structures. In laser buildup welding using powder, the laser heats the workpiece and melts it locally. At the same time, an inert gas mixed with the powder is fed in. The working region is supplied with the powder/gas mixture via coaxial nozzles. At the heated place, the powder melts and joins to the workpiece. Use of the surface-modified powder now enables even powders which otherwise cannot be melted readily by the laser owing to an excessively low degree of absorption to be processed by laser buildup welding.

BRIEF DESCRIPTION OF THE DRAWINGS

The invention will be illustrated below with the aid of the figures. The figures show FIG. 1 a schematic depiction of individual particles of the surface-modified powder for laser sintering according to an embodiment of the present invention, and FIG. 2 a schematic depiction to illustrate the use of the powder of FIG. 1 in selective laser sintering.

DETAILED DESCRIPTION OF THE PREFERRED EMBODIMENTS

Figure 1:
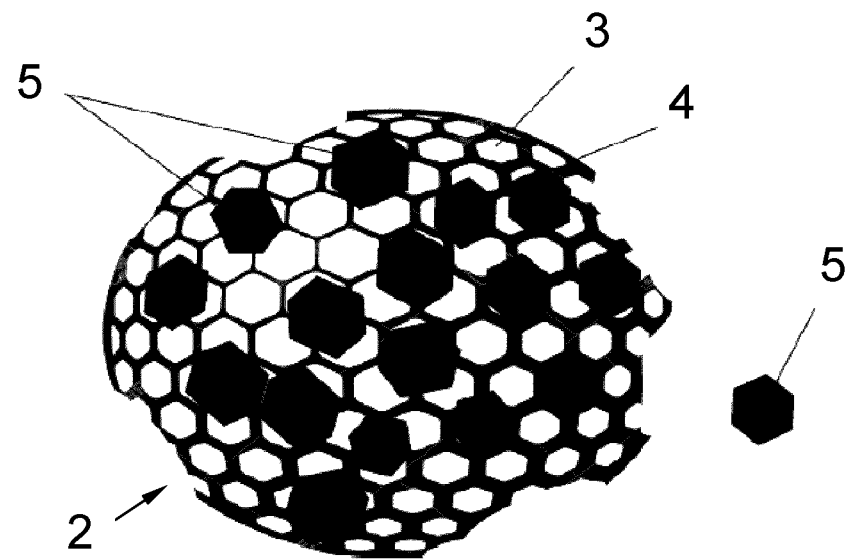
Figure 1:
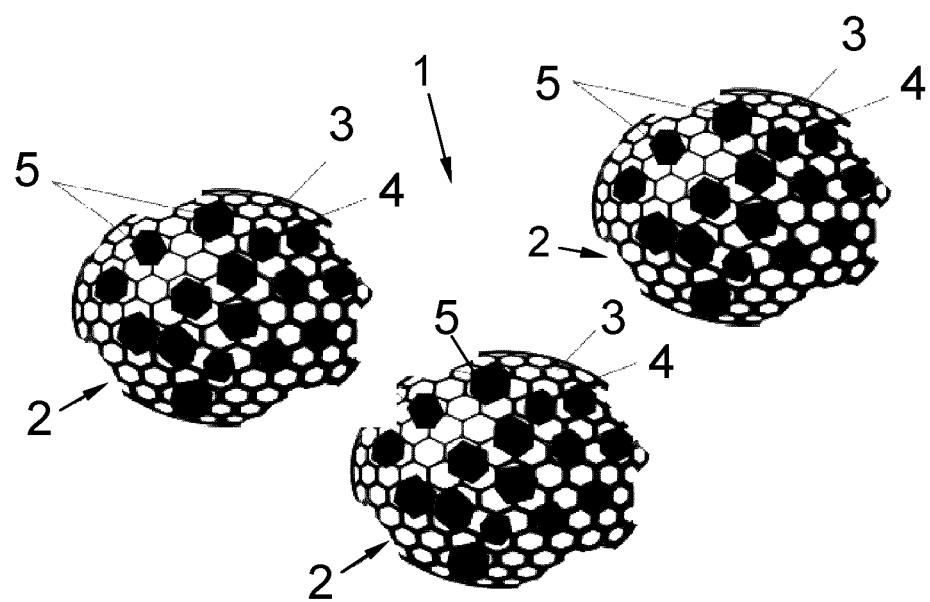

FIG. 1 shows a greatly enlarged, schematic depiction of only a few particles 2 of the surface-modified powder 1. The individual particles 2 have an irregular shape with an equivalent diameter D50 of about 30 μm.

Each particle 2 of the powder 1 consists of a particle core 3 to the surface 4 of which laser absorbers 5 are attached in molecular form. The laser absorbers 5 cover at least 30% of the surface 4 of each particle core 3.

The particle cores 3 consist, in particular, of pure copper having a low degree of absorption of about 5% for incident laser radiation having a wavelength of 1064 nm. The laser absorbers 5 are particles of a metal hydroxide, for example dicopper hydroxide phosphate, which has a very high degree of absorption for the incident laser radiation having a wavelength of 1064 nm.

The laser absorbers 5 are bound to the surface 4 of the particle cores 3 by physisorption. The attachment can, for example, be brought about by a process of mixing the particle cores 3 composed of copper and the laser absorbers 5.

Figure 2:
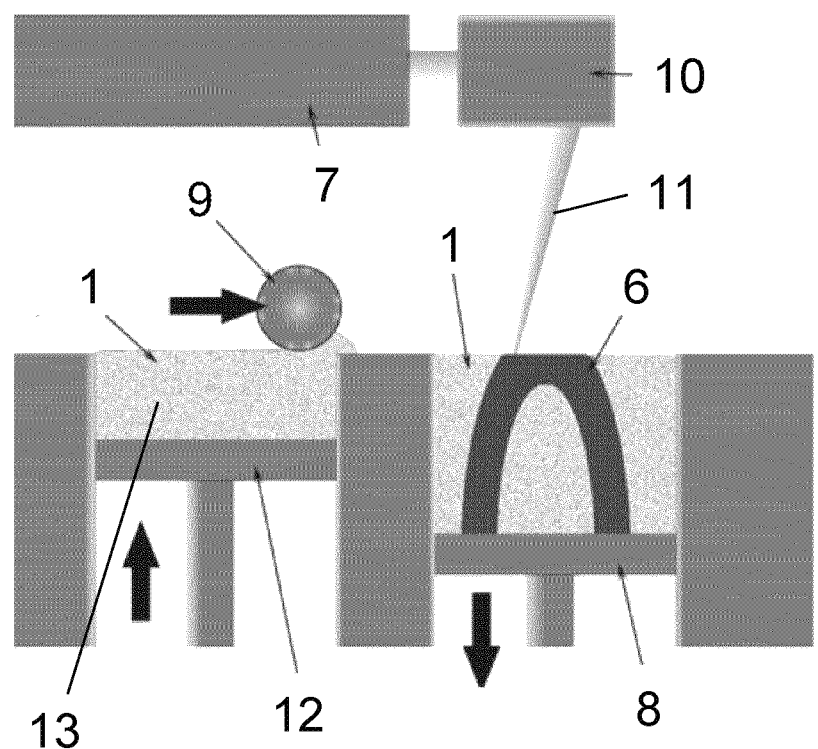

The powder 1 which has been surface-modified in this way is used for laser sintering, in particular for selective laser sintering. The process of selective laser sintering is illustrated below with the aid of FIG. 2:

Selective laser sintering is an additive manufacturing process for producing a component 6 from the powder 1 by laser sintering using a laser 7. The geometric data of the component 6 to be produced have to be present as layer data. A laser scanner 10 is controlled by means of the layer data for the component 6 and transmits the laser radiation 11 of the laser 7 line-by-line in an intensity-controlled manner to the powder 1.

The powder 1 is firstly applied from a powder stock 13 as a layer having a layer thickness of from 20 to 40 μm (powder bed) over the full area of a building platform 8 using a powder-supplying piston 12 and a roller 9. The layer data of the component 6 are then sintered layer-by-layer under computer control in the powder bed so as to correspond to the layer contour of the component 6. The building platform 8 is lowered slightly before each step in order subsequently to apply the next layer of powder 1 from the powder stock using the roller 9. As an alternative, a doctor blade can be used.

Undercut contours can also be produced by the layerwise production of the component 6. Support structures are not necessary because the component 6 is supported by the surrounding powder 1 while it is being produced.

LIST OF REFERENCE NUMERALS

1 Powder
2 Particle
3 Particle core
4 Surface
5 Laser absorber
6 Component
7 Laser
8 Building platform
9 Roller
10 Laser scanner
11 Laser radiation
12 Piston
13 Powder stock

The invention claimed is:

1. A surface-modified powder for laser sintering, comprising
    particles, each of the particles having a particle core consisting of pure copper and laser absorbers bound to a surface of each particle core, wherein the laser absorbers partially occupy the surface of each particle core to an extent of at least 25% and have a higher degree of absorption for laser radiation in the near infrared range for laser sintering with respect to the particle core,
    wherein the laser absorbers consist of dicopper hydroxide phosphate, are bound by physisorption to the surface of the each particle core by a process of mixing the particle cores and the laser absorbers, and have a degree of absorption of at least 20% for the laser radiation.

2. The surface-modified powder as claimed in claim 1, wherein the laser absorbers are present in molecular form.

3. The surface-modified powder as claimed in claim 1, wherein the laser radiation has a wavelength of 1064 nm.

4. A method of laser sintering, comprising:
    providing a surface-modified powder as claimed in claim 1 in a powder bed, and laser sintering the surface-modified powder in the powder bed.

5. The method of laser sintering claimed in claim 4, wherein the step of laser sintering comprises using an Nd:YAG laser or a fiber laser.

6. A method of producing a three-dimensional structure, comprising:
    providing a surface-modified powder as claimed in claim 1, and
    conducting selective laser sintering to form the three-dimensional structure.

7. The method of producing a three-dimensional structure claimed in claim 6, wherein the step of conducting selective laser sintering comprises using an Nd:YAG laser or a fiber laser.

8. A method of laser buildup welding, comprising:
    providing the surface-modified powder as claimed in claim 1;
    conducting the laser buildup welding using the surface-modified powder.

9. The surface-modified powder as claimed in claim 1, wherein the laser absorbers have a degree of absorption of at least 30% for the laser radiation.

* * * * *